US012460481B2

(12) United States Patent
Ali et al.

(10) Patent No.: US 12,460,481 B2

(45) Date of Patent: Nov. 4, 2025

(54) BOTTOM HOLE APPARATUS RPM REGULATOR

(71) Applicant: SAUDI ARABIAN OIL COMPANY, Dhahran (SA)

(72) Inventors: Syed Muhammad Ali, Abqaiq (SA); Yassar Kamal Zia, Abqaiq (SA); Dautmammet Rejepov, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/424,566

(22) Filed: Jan. 26, 2024

(65) Prior Publication Data

US 2025/0243709 A1 Jul. 31, 2025

(51) Int. Cl.
*E21B 4/00* (2006.01)
*F16H 1/28* (2006.01)

(52) U.S. Cl.
CPC ................ *E21B 4/006* (2013.01); *F16H 1/28* (2013.01)

(58) Field of Classification Search
CPC .................................. E21B 4/006; F16H 1/28
See application file for complete search history.

(56) References Cited

U.S. PATENT DOCUMENTS

| | | | | |
|---|---|---|---|---|
| 6,520,271 | B1 * | 2/2003 | Martini | E21B 21/103 175/21 |
| 7,204,324 | B2 | 4/2007 | Gleitman et al. | |
| 7,481,281 | B2 | 1/2009 | Schuaf | |
| 9,470,042 | B2 | 10/2016 | Snyder et al. | |
| 9,797,197 | B1 * | 10/2017 | Eddy | E21B 7/067 |
| 11,125,033 | B2 | 9/2021 | Edvardsen | |
| 11,365,620 | B2 | 6/2022 | Veltman | |
| 2011/0100715 | A1 * | 5/2011 | Kolle | E21B 21/16 475/71 |
| 2021/0285289 | A1 * | 9/2021 | Wang | E21B 4/006 |
| 2022/0136329 | A1 * | 5/2022 | Drenth | E21B 3/02 175/57 |

FOREIGN PATENT DOCUMENTS

| | | | |
|---|---|---|---|
| CN | 115162943 | A | 10/2022 |
| DK | 2295712 | T3 | 4/2018 |
| EP | 1076153 | B1 | 2/2005 |
| RU | 2478781 | C2 | 4/2013 |

* cited by examiner

*Primary Examiner* — Nicole Coy
*Assistant Examiner* — Nicholas D Wlodarski
(74) *Attorney, Agent, or Firm* — Osha Bergman Watanabe & Burton LLP

(57) ABSTRACT

A system for drilling a wellbore includes a drill string, bottom hole apparatus, and a rotation regulator. The rotation regulator includes a compound planetary gear set with a first and second planetary unit. The first planetary unit is disposed in a proximal region of the rotation regulator from the drill string. The second planetary unit is disposed in a distal region of the rotation regulator from the drill string. The gear set includes a hollow central shaft. The central shaft is common between the first and second planetary units. The central shaft is of a different outer diameter at each planetary unit. A bearing is arranged between the first and second planetary units. The drill string, rotation regulator, and bottom hole apparatus are connected in series, so the rotation regulator mechanically transmits the rotation of the drill string into the bottom hole apparatus.

9 Claims, 4 Drawing Sheets

BOTTOM HOLE APPARATUS RPM REGULATOR

BACKGROUND

In the course of drilling a wellbore, it is often necessary to agitate fluid and cuttings midway along the wellbore to keep the cuttings suspended in the drilling fluid to be transported to the surface. In inclined or horizontal wellbores, it is especially important to agitate the fluid and cuttings as without agitation, cuttings can settle out of suspension and form blockages in the wellbore. The agitation can be easily accomplished by using a drill string undersized relative to the wellbore and rotating that drill string at a high rate so it develops an eccentric motion in the wellbore to "stir" the fluid. However, the rates of rotation required to effectively stir the fluid are often significantly higher than the optimal rotation rate for the drilling bit at the distal end of the drill string. Further, it is important to maintain the drilling bit and drill string rotating in the same direction. Many solutions for this issue are expensive and complicated.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one or more embodiments, the present invention relates to a system for drilling a wellbore. The system includes a drill string, bottom hole apparatus, and a rotation regulator. The rotation regulator includes a compound planetary gear set with a first and second planetary unit. The first planetary unit is disposed in a proximal region of the rotation regulator from the drill string. The second planetary unit is disposed in a distal region of the rotation regulator from the drill string. The gear set includes a hollow central shaft. The central shaft is common between the first and second planetary units. The central shaft is of a different outer diameter at each planetary unit. A bearing is arranged between the first and second planetary units. The drill string, rotation regulator, and bottom hole apparatus are connected in series, so the rotation regulator mechanically transmits the rotation of the drill string into the bottom hole apparatus at a different rate of rotation from that of the drill string. The drill string and central shaft are fluidly connected.

In general, in one aspect, embodiments of the present invention relate to a method for using a rotation regulator. The method includes attaching a bottom hole apparatus to a rotation regulator and a drill string in series to form a drill set. The rotation regulator includes a compound planetary gear set including a first and second planetary unit. The first planetary unit is disposed in a proximal region of the rotation regulator from the drill string and the second planetary unit is disposed in a distal region of the rotation regulator from the drill string. The gear set includes a hollow central shaft. The gear set includes a hollow central shaft that is common between the first and second planetary units. The central shaft is of a different outer diameter at each planetary unit. A bearing is arranged between the first and second planetary units. The method further includes disposing the drill set into a wellbore with the bottom hole apparatus arranged towards a distal end of the wellbore, attaching additional stands of drill string to the drill set until the bottom hole apparatus is at the distal end of the wellbore, and connecting an end of the drill string to a motor.

Other aspects and advantages of the claimed subject matter will be apparent from the following description and the appended claims.

DETAILED DESCRIPTION

In one aspect, embodiments disclosed herein relate to a system for drilling a wellbore. The system includes a rotation regulator, in addition to a drill string and bottom hole apparatus (BHA) such as a drill bit. The drill string, rotation regulator, and BHA are connected in series in that order. In another embodiment, to distance the rotation regulator from the BHA, an additional length of drill string is disposed between the rotation regulator and the BHA. The rotation regulator is configured to convert the high rotation rate input of a drill string into a lower rotation rate output with high torque for the BHA. In one application, the high rotation of the drill string serves to agitate drilling fluid and cuttings in the wellbore while the drill bit BHA remains at a low optimal rotation rate. By maintaining the drill string rotation at the highest possible RPM, optimal hole cleaning and fluid agitation is achieved. Meanwhile, the rotation regulator minimizes stress, fatigue, and vibrations on the BHA that could lead to premature failure.

Figure 1:
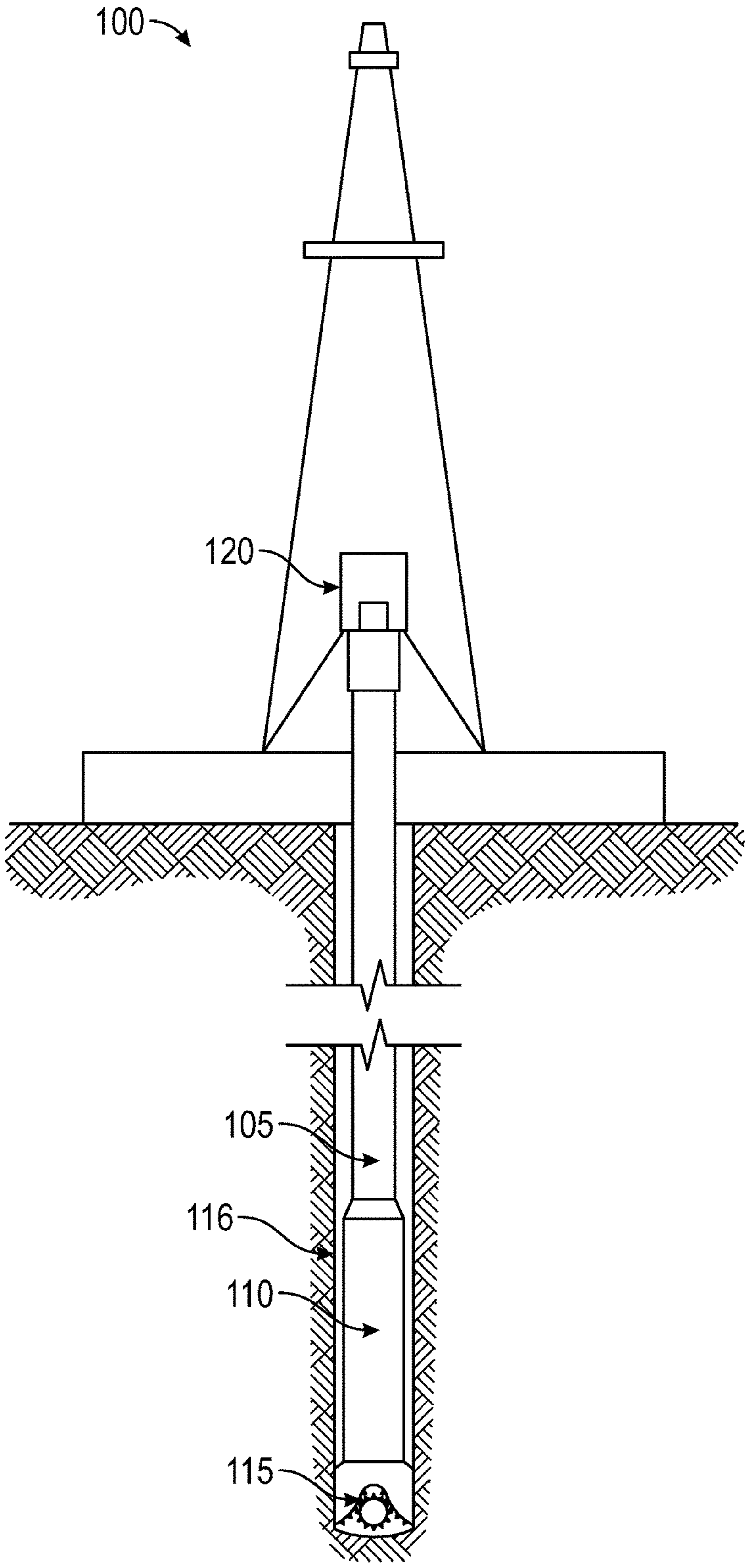
FIG. 1 shows a drilling arrangement in accordance with one or more embodiments.

FIG. 1 shows a drilling arrangement in accordance with one or more embodiments. The drill rig 100 suspends the drill string 105 and by extension the rotation regulator 110 and BHA 115 in the wellbore 016. The drill rig 100 further includes a motor 120 that connects to the drill string 105 and supplies the rotational energy through the drill string 105 and rotation regulator 110 to the BHA 115. In the course of normal drilling, drilling fluids are circulated down the drill string 105 and out the BHA 115 to push cuttings to the surface between the drill string 105 and the wall of the wellbore 116. The wellbore 116 and drill string 105 are shown shortened here for space but drill strings 105 and wellbores 116 can be many kilometers long, providing a long time and a large area for cuttings dislodged by the BHA 115 or other suspended materials to settle out of the drilling fluid if the suspension fluid is not agitated.

To minimize friction and ensure an easy fit, among other reasons, drill strings 105 are often undersized compared to the BHA 115 and thus the wellbore 116. When a long thin piece such as the drill string 105 is spun at a high enough rate, the inertia of the string pulls the middle area of the piece outward. Thus, when a drill string 105 is spun at a sufficiently high rate, the drill string 105 makes contact with the wall of the wellbore 116 and travels around the circumference of the wellbore 116 instead of simply twisting in place, thereby agitating the fluid therein. The rotational rates required to achieve this effect are often significantly greater than the ideal rotational rate for the BHA 115 because high speed rotation on a drill bit BHA 115 for instance, leads to quicker heat generation, and premature wear. That is where the rotation regulator 110 becomes important. By converting a rapid drill string 105 rotation rate to a significantly slower rotation rate for the BHA 115, the rotation regulator 110 allows for drilling fluid agitation in the wellbore 116 while maintaining a relatively low rotation rate for the BHA 115.

Figure 2:
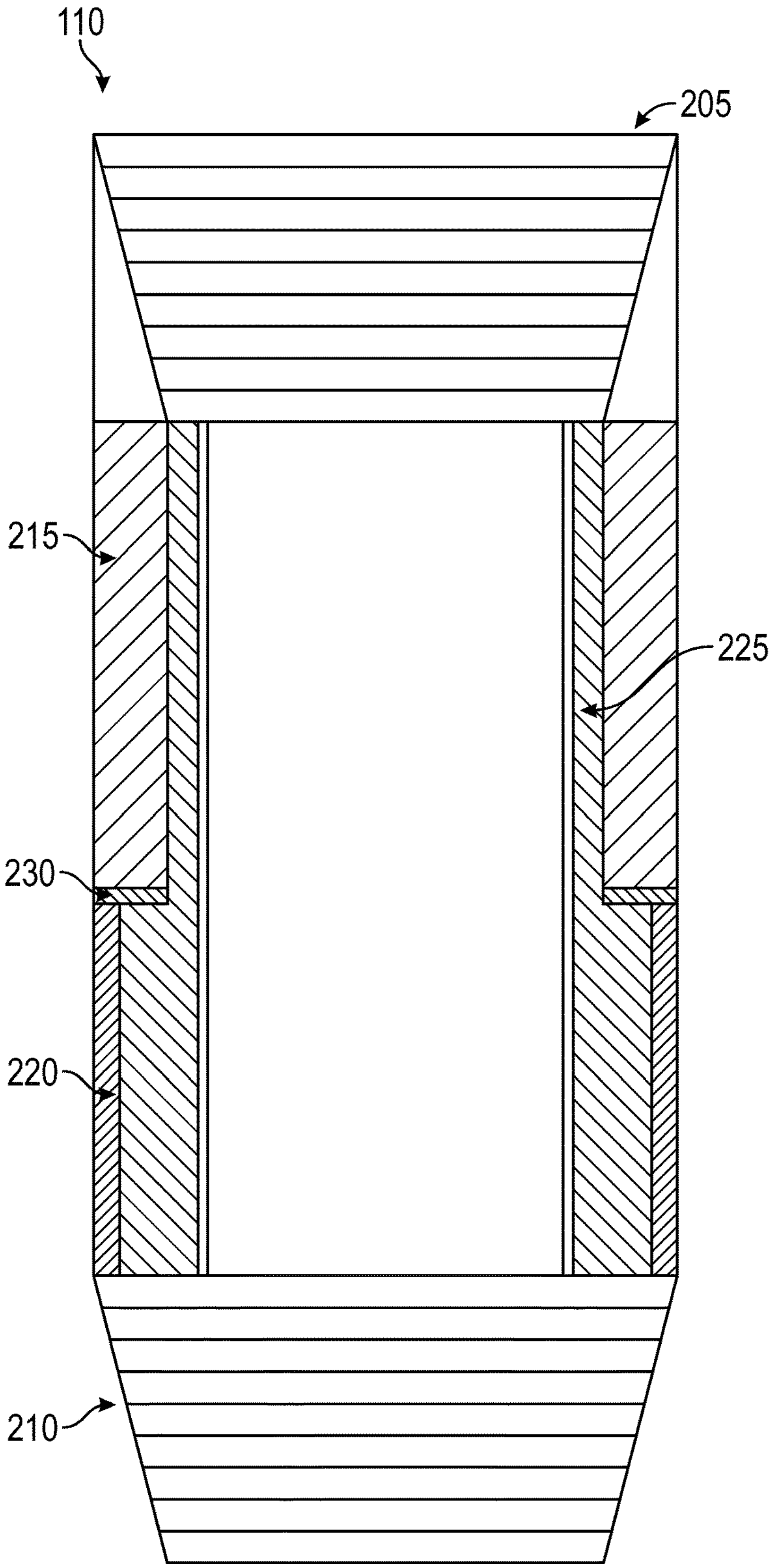
FIG. 2 shows a rotation regulator in accordance with one or more embodiments.

FIG. 2 shows a simplified cross section of the rotation regulator in accordance with one or more embodiments. The rotation regulator 110 includes a first connection 205 that connects to the drill string 105 and a second connection 210 that connects to the BHA 115. To transmit the rotation from the drill string 105 to the BHA 115 while converting the rotational speed according to a predetermined ratio, a compound planetary gear set is comprised in the rotation regulator 110. The gear set includes a first planetary unit 215 and a second planetary unit 220 that share a common central shaft 225 between them. A bearing surface 230 is arranged between each planetary unit so that each can rotate independently of the other except for the central shaft 225 which is shared by the planetary units. The first planetary unit 215 is disposed in a proximal region of the rotation regulator 110 from the drill string 105 and the second planetary unit is disposed in a distal region from the drill string 105.

When the drill string 105 is rotated by a motor 120 attached at the surface end of the drill string 105, the rotation is transmitted from the drill string 105 to the first planetary unit 215, through the central shaft 225, to the second planetary unit 220 and further to the BHA 115. The central shaft 225 is of a different outer diameter at each planetary unit to facilitate a given gearing ratio. Rotation induced in the first planetary unit 215 is mechanically converted by that first planetary unit 215 to a slower and opposite rotation rate of the central shaft 225 and lastly converted by the second planetary unit 220 to the final rotation rate of the BHA 115. The final rotation rate of the BHA 115 is in the same direction as the drill string 105 but at a reduced rotational rate from that of the drill string 105. The difference in the gear ratios between the first and second planetary units 215, 220 determines the overall gear ratio of the rotation regulator 110. In one or more embodiments, the overall gear ratio of the rotation regulator 110 is 1:2. In an exemplary embodiment, the RPM of the drill string 105 is 180-200 RPM and the RPM of the BHA 115 is reduced to 90-100 RPM by the rotation regulator 110.

In one or more embodiments, the central shaft 225 is hollow and the rotation regulator 110 is arranged such that, when attached to a suitable drill string 105 and BHA 115, a fluid connection is formed to put them in fluid communication with each other and allow fluid to flow from the drill string 105, through the rotation regulator 110 and out a given BHA 115, or vice versa allowing fluid to flow up the drill string 105 from the BHA 115.

Figure 3:
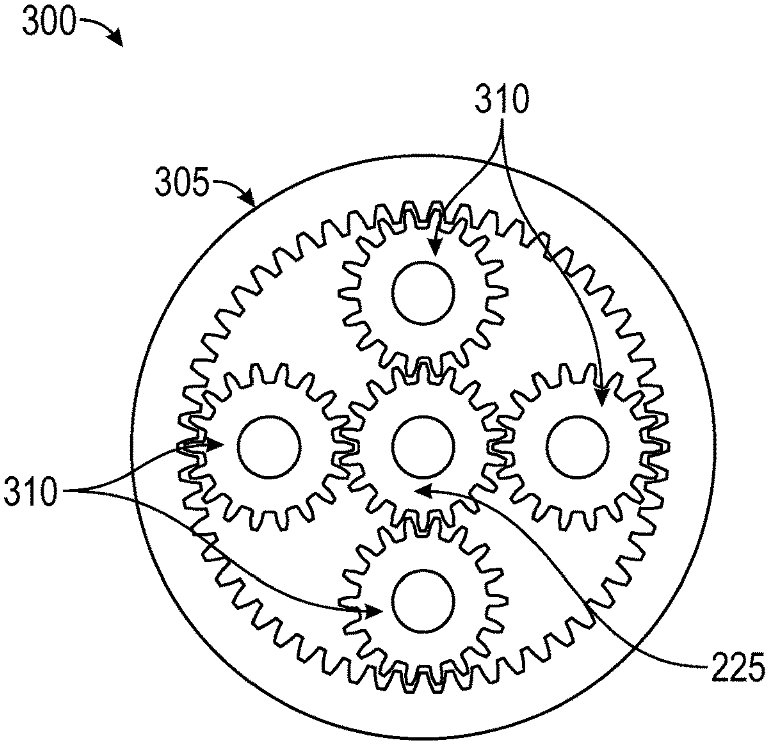
FIG. 3 shows a planetary unit in accordance with one or more embodiments.

FIG. 3 shows a planetary unit in accordance with one or more embodiments. A planetary unit 300 comprises a ring gear 305, a plurality of planet gears 310 and a sun gear 225, which in the case of the present invention is the central shaft 225. The relative gear ratios between the ring gear 305, planet gears 310, and sun gear 225 determine the gear ratio of the overall planetary unit 300 in terms of the relative motion between each component as described above.

Figure 4:
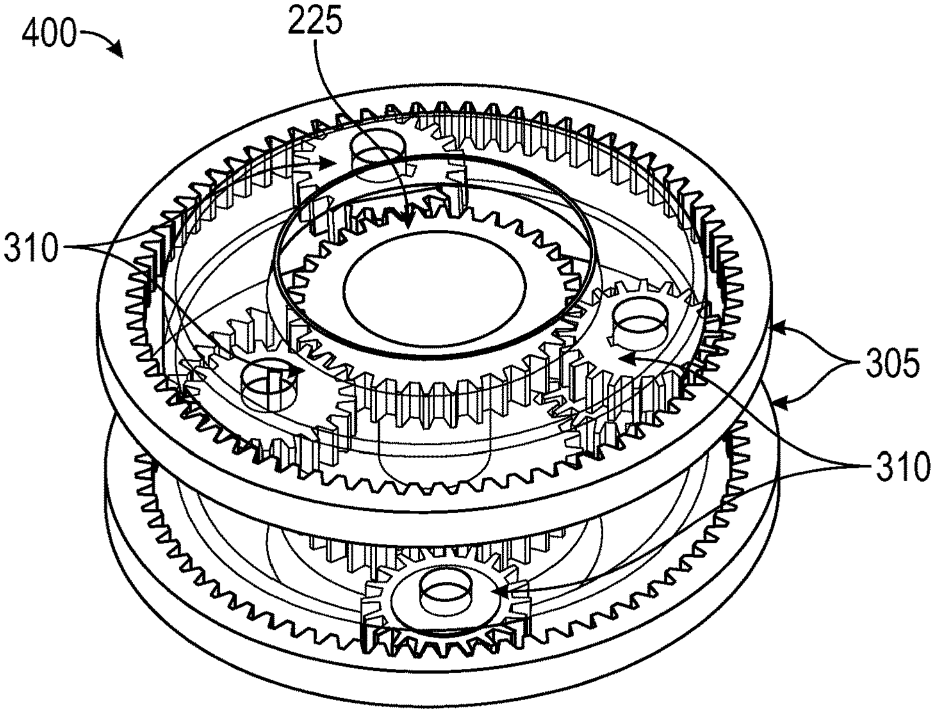
FIG. 4 shows a compound planetary gear in accordance with one or more embodiments.

FIG. 4 shows a compound planetary gear in accordance with one or more embodiments. A compound planetary gear 400 as shown in FIG. 3 is an arrangement of planetary units 300 sharing a central shaft 225. The present invention proposes to employ a planetary gear set as shown except with the central shaft 225 having different diameters at each planetary unit 300. This allows for each planetary unit 300 to have a different gearing ratio while having the same size ring gears 305. For a larger diameter of central shaft 225, smaller diameter planet gears 310 would be employed and vice versa.

Figure 5:
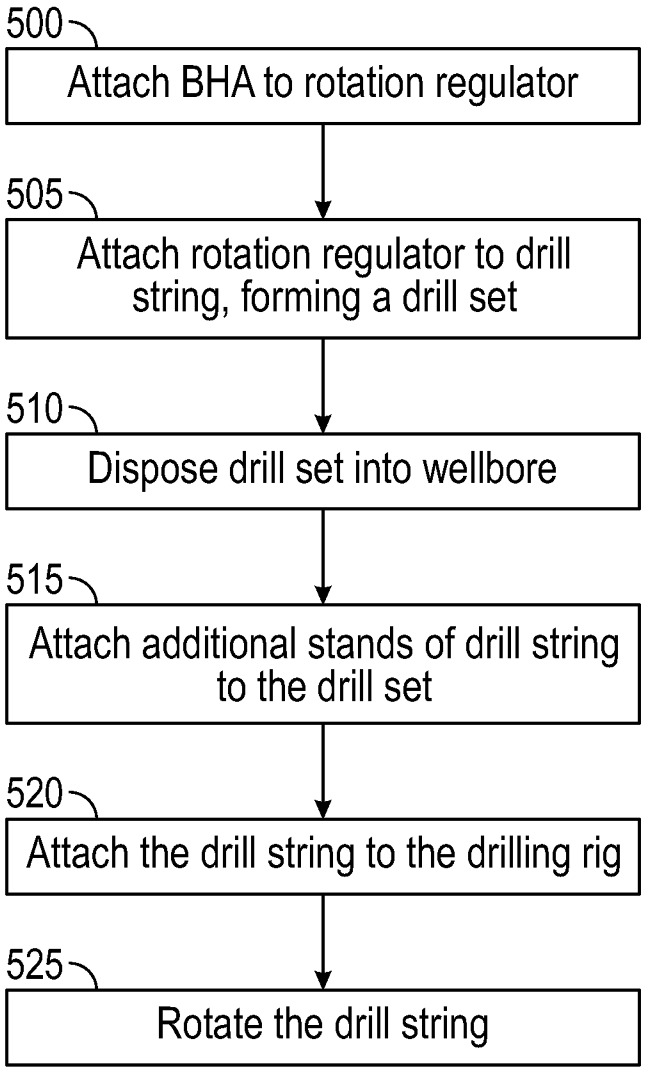
FIG. 5 shows a flowchart in accordance with one or more embodiments.

FIG. 5 shows a flowchart in accordance with one or more embodiments. In one or more embodiments, the method of FIG. 5 is performed with a drilling arrangement that includes a rotation regulator 110 as described above.

In step 500, the BHA 115 is attached to the rotation regulator 110. In step 505, the rotation regulator 110 is attached to the drill string 105, forming a drill set with the rotation regulator 110, BHA 115, and drill string 105 attached in series with the drill string 105 at one end and the BHA 115 at the other. In step 510, the drill set is disposed into the wellbore 116 with the BHA 115 being oriented towards a distal end of the wellbore 116. In step 515, additional stands of drill string 105 are attached to the drill set to push the BHA 115 to the distal end of the wellbore 116. In step 520, the drill string 105 is attached to the drilling rig 100. In one or more embodiments, additional lengths of drill string 105 may be attached between the BHA 115 and the rotation regulator 110. In step 525, the drill string 105 is rotated and the rotation regulator 110 converts that rotation of the drill string 105 into a different speed rotation for the BHA 115.

Embodiments of the present disclosure may provide at least one of the following advantages. The present invention does not require any electrical or chemical power to convert mechanical rotation rates. The simplicity and aforementioned mechanical nature of the rotation regulator 110 further lends it a high degree of robustness and reliability. The rotation regulator 110 can be readily constructed with heat and/or corrosion resistant materials to function in harsh environments. Embodiments of the present disclosure are tougher, simpler, and more reliable than related existing methods and devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for drilling a wellbore, the system comprising:

a drill string, a bottom hole apparatus, and a rotation regulator, wherein the rotation regulator comprises:

a compound planetary gear set comprising a first and second planetary unit, wherein the first planetary unit is disposed in a proximal region of the rotation regulator from the drill string and the second planetary unit is disposed in a distal region of the rotation regulator from the drill string, wherein the gear set comprises a hollow central shaft, wherein the central shaft is common between the first and second planetary units, and wherein the central shaft is of a different outer diameter at each planetary unit, wherein a bearing is arranged between the first and second planetary units, wherein the drill string, rotation regulator, and bottom hole apparatus are connected in series such that the rotation regulator mechanically transmits the rotation of the drill string into the bottom hole apparatus at a different rate of rotation from that of the drill string, wherein the drill string and central shaft are fluidly connected, and wherein the drill string is configured to contact walls of the wellbore during rotation such that the drill string travels around a circumference of the wellbore while rotating.

2. The system of claim 1, wherein the bottom hole apparatus is a drill bit.

3. The system of claim 1, wherein a ratio between input rotation speed and output rotation speed of the rotation regulator is 2:1.

4. The system of claim 1, wherein the drill string is hollow, wherein the central shaft is hollow, wherein the drill string, central shaft, and the wellbore are in fluid communication with each other.

5. A method for using a rotation regulator, the method comprising:

attaching a bottom hole apparatus to the rotation regulator and a drill string in series to form a drill set, wherein the rotation regulator comprises:

a compound planetary gear set comprising a first and second planetary unit, wherein the first planetary unit is disposed in a proximal region of the rotation regulator from the drill string and the second planetary unit is disposed in a distal region of the rotation regulator from the drill string, wherein the gear set comprises a hollow central shaft, wherein the central shaft is common between the first and second planetary units, and wherein the central shaft is of a different outer diameter at each planetary unit, wherein a bearing is arranged between the first and second planetary units, disposing the drill set into a wellbore, wherein the drill set is oriented with the bottom hole apparatus towards a distal end of the wellbore, attaching additional stands of drill string to the drill set until the bottom hole apparatus is at the distal end of the wellbore, connecting an end of the drill string to a motor, and configuring the drill string to contact walls of the wellbore during rotation such that the drill string travels around a circumference of the wellbore while rotating.

6. The method of claim 5, further comprising rotating the drill string, wherein the rotation regulator converts a rotation speed such that the drill string and the bottom hole apparatus rotate at different rates.

7. The method of claim 5, wherein the bottom hole apparatus is a drill bit.

8. The method of claim 5, wherein a ratio between input rotation speed and output rotation speed of the rotation regulator is 2:1.

9. The method of claim 5, wherein the drill string is hollow, wherein the central shaft is hollow, and wherein the drill string, central shaft, and the wellbore are in fluid communication with each other.

* * * * *